(12) United States Patent
Amagai et al.

(10) Patent No.: US 10,626,665 B2
(45) Date of Patent: Apr. 21, 2020

(54) VEHICLE WEATHER STRIP

(71) Applicants: HONDA MOTOR CO., LTD., Tokyo (JP); Nishikawa Rubber Co., Ltd., Hiroshima (JP)

(72) Inventors: Toyohisa Amagai, Wako (JP); Kazutaka Imamura, Wako (JP); Akiyoshi Kubota, Hiroshima (JP); Toshifumi Matsuura, Hiroshima (JP)

(73) Assignees: HONDA MOTOR CO., LTD., Tokyo (JP); NISHIKAWA RUBBER CO., LTD., Hiroshima-shi (JP)

( * ) Notice: Subject to any disclaimer, the term of this patent is extended or adjusted under 35 U.S.C. 154(b) by 85 days.

(21) Appl. No.: 15/952,357

(22) Filed: Apr. 13, 2018

(65) Prior Publication Data

US 2018/0298678 A1    Oct. 18, 2018

(30) Foreign Application Priority Data

Apr. 15, 2017 (JP) ................. 2017-080995
Jul. 13, 2017 (JP) ................. 2017-136695

(51) Int. Cl.
*E06B 7/16* (2006.01)
*E06B 7/23* (2006.01)
*B60J 10/27* (2016.01)
*B60J 10/25* (2016.01)
*B60J 10/86* (2016.01)
*B60J 10/78* (2016.01)

(52) U.S. Cl.
CPC ............. *E06B 7/2312* (2013.01); *B60J 10/25* (2016.02); *B60J 10/27* (2016.02); *B60J 10/78* (2016.02); *B60J 10/86* (2016.02); *E06B 7/2309* (2013.01)

(58) Field of Classification Search
CPC ...... E06B 7/2312; E06B 7/2309; B60J 10/86; B60J 10/27
USPC ............ 49/484.1, 489.1, 495.1, 498.1, 499.1
See application file for complete search history.

(56) References Cited

U.S. PATENT DOCUMENTS

| | | | | |
|---|---|---|---|---|
| 6,131,342 A * | 10/2000 | Miyamoto | ............... | B60J 10/24 |
| | | | | 49/484.1 |
| 7,325,859 B1 * | 2/2008 | Brancaleone | .......... | B60J 5/0402 |
| | | | | 296/146.9 |
| 8,353,130 B2 * | 1/2013 | Fukuta | .................... | B60J 10/24 |
| | | | | 49/493.1 |
| 9,242,534 B2 * | 1/2016 | Im | .......................... | B60J 5/0469 |
| 2005/0178069 A1 * | 8/2005 | Iwasa | ...................... | B60J 10/22 |
| | | | | 49/498.1 |
| 2006/0042170 A1 * | 3/2006 | Furuzawa | ............. | B60J 10/248 |
| | | | | 49/489.1 |

(Continued)

FOREIGN PATENT DOCUMENTS

JP    2001-105888 A    4/2001

*Primary Examiner* — Jerry E Redman
(74) *Attorney, Agent, or Firm* — Rankin, Hill & Clark LLP

(57) ABSTRACT

A vehicle weather strip according to the present invention includes a base that is attached to a door, a protrusion (a first elastic contact section) that comes into elastic contact with a sash of the door further in a door outer side direction than the base, a protrusion (a second elastic contact section) that comes into elastic contact with the sash further in the door outer side direction than the protrusion (the first elastic contact section). The protrusion (the second elastic contact section) is in contact with at least a molding in the sash.

5 Claims, 5 Drawing Sheets

(56) References Cited

U.S. PATENT DOCUMENTS

| | | | |
|---|---|---|---|
| 2006/0137255 A1* | 6/2006 | Nozaki | B60J 10/248 49/498.1 |
| 2006/0162256 A1* | 7/2006 | Tsuchida | B60J 10/79 49/479.1 |
| 2007/0137112 A1* | 6/2007 | Furuzawa | B60J 10/24 49/489.1 |
| 2008/0282616 A1* | 11/2008 | Eguchi | B60J 10/24 49/489.1 |
| 2011/0126473 A1* | 6/2011 | Prater | B60J 10/265 49/484.1 |
| 2012/0023831 A1* | 2/2012 | Matsumoto | B60J 10/24 49/489.1 |
| 2015/0210149 A1* | 7/2015 | Saiki | B60J 5/0404 296/152 |
| 2015/0266364 A1* | 9/2015 | Im | B60J 10/76 49/495.1 |
| 2018/0298678 A1* | 10/2018 | Amagai | B60J 10/78 |
| 2018/0298679 A1* | 10/2018 | Matsuura | E06B 7/2312 |
| 2019/0176602 A1* | 6/2019 | Takeda | B60J 10/21 |

* cited by examiner

VEHICLE WEATHER STRIP

BACKGROUND OF THE INVENTION

1. Field of the Invention

The present invention relates to a vehicle weather strip used in a vehicle body.

2. Description of the Related Art

There has been known a weather strip that, when a door is closed against a door opening of a vehicle body, seals a gap between the door opening and the door (see, for example, Japanese Laid-open Patent Publication No. 2001-105888 (Patent Literature 1). The weather strip is formed of an elastic member that extends along the door opening. The weather strip includes a base that is attached to the door side, a seal section annular in sectional view integrally molded with the base, and a lip that is adjacent to the seal section and extends in a tongue shape from the base. The seal section and the lip respectively come into elastic contact with the door opening side during the closing of the door to seal the gap.

In a sash forming a window frame of the door, the base of the weather strip is fit into a groove-like retainer formed in the sash, whereby the weather strip is attached to the door.

Incidentally, the sash includes an inner section including a retainer forming surface section opposed to the door opening in a closed state of the door and an outer section disposed on a vehicle outer side of the inner section and including a molding attachment surface section. The outer section and the inner section are integrally formed to form a substantially T-shape in sectional view crossing the longitudinal direction of the sash.

In the conventional weather strip, clearance is formed between the retainer and the base in order to facilitate the fitting of the base into the retainer during assembly of the weather strip to the sash. To prevent a backlash of the base in the retainer due to the clearance, the conventional weather strip includes, in the root of the lip, a protrusion that comes into elastic contact with the rear surface of the outer section (a surface on the vehicle inner side of the outer section).

However, in the conventional weather strip (see, for example, Patent Literature 1), for example, when powerful water such as high-pressure cleaning water passes across a space between the rear surface of the outer section and the protrusion in the root of the lip, the water easily intrudes into the retainer because of the clearance. The water intruded into the retainer leaks into a vehicle interior. In the conventional weather strip, it is also likely that water intrudes into a space between the molding attachment surface section of the outer section and a molding.

Therefore, there is a demand for a weather strip more excellent in waterproof performance than before.

SUMMARY OF THE INVENTION

An object of the present invention is to provide a vehicle weather strip more excellent in waterproof performance than before.

To solve the problem, a vehicle weather strip includes: a base that is attached to a door; a first elastic contact section that comes into elastic contact with a sash of the door further in a door outer side direction than the base; and a second elastic contact section that comes into elastic contact with the sash further in the door outer side direction than the first elastic contact section. The second elastic contact section is in elastic contact with at least a molding in the sash.

According to the present invention, it is possible to provide a vehicle weather strip more excellent in waterproof performance than before.

DETAILED DESCRIPTION OF THE EMBODIMENTS

A vehicle weather strip (hereinafter simply referred to as "weather strip") according to a mode for carrying out the present invention (an embodiment) is described in detail.

The weather strip according to this embodiment is mainly characterized by including a protrusion that comes into elastic contact with a molding configuring a sash of a door.

In the following example, a front side door of a vehicle is referred to an example and a molding applied to the front side door is described. However, the door is not limited to the front side door. First, the door of the vehicle is schematically described. Then, the weather strip is described in detail.

<The Door of the Vehicle>

Figure 1:
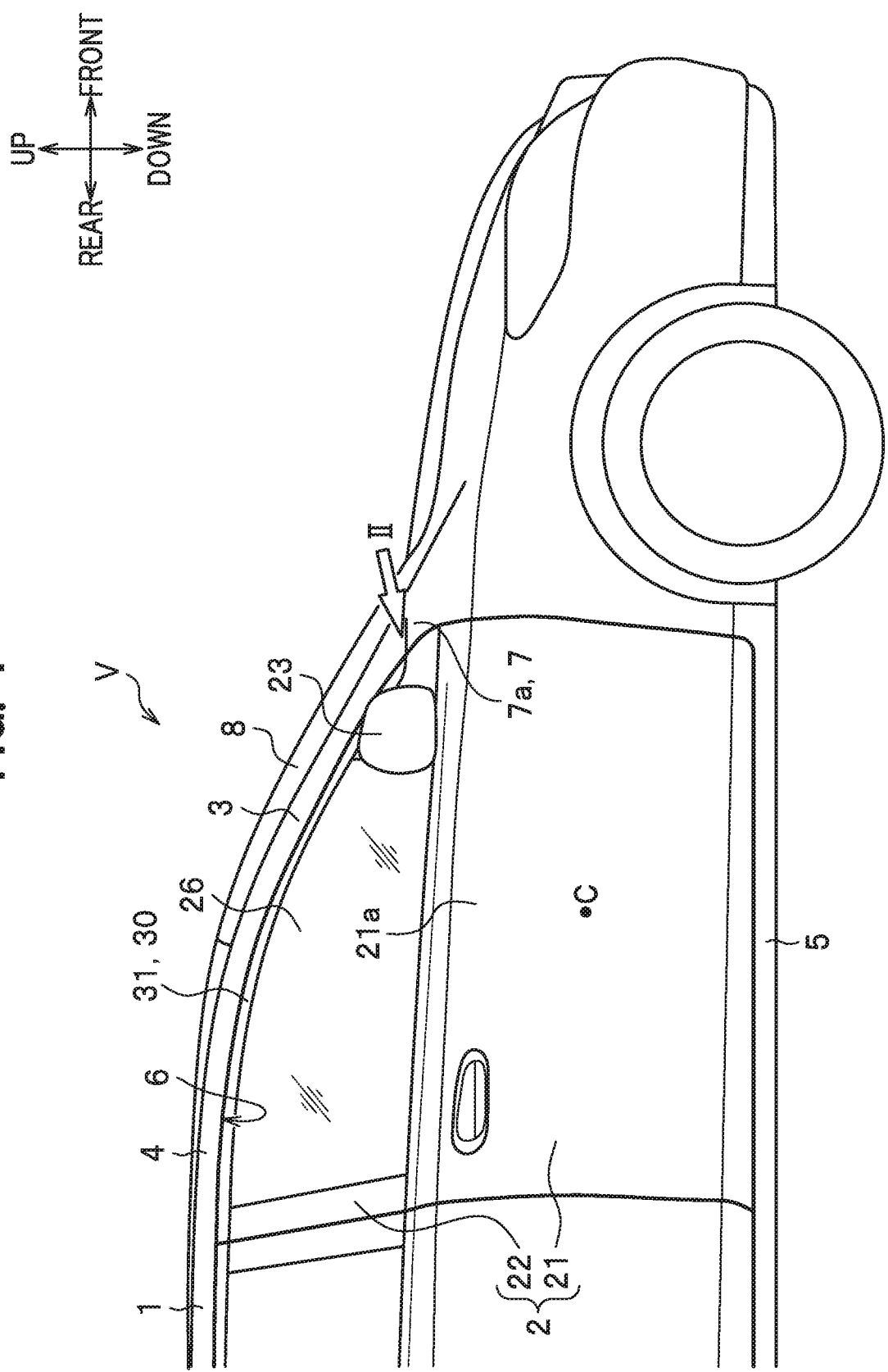
FIG. 1 is a partial side view of a vehicle including a door applied with a vehicle weather strip according to the present invention.
Figure 2:
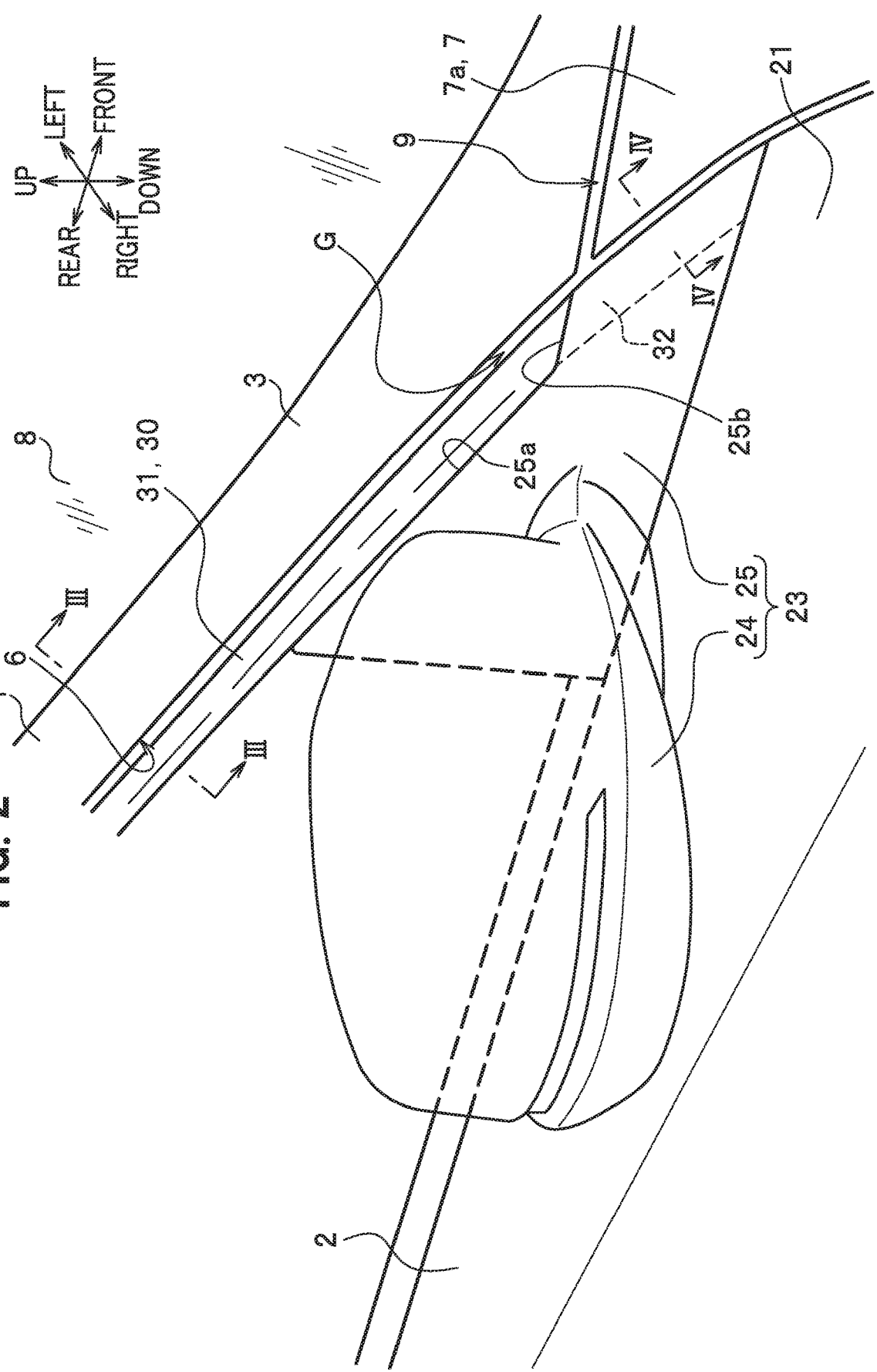
FIG. 2 is a partial perspective view of a door portion near a mirror viewed from an arrow II direction in FIG. 1.

FIG. 1 is a partial side view of a vehicle V including a door 2 applied with a weather strip 10 (see FIG. 3) according to the embodiment of the present invention. FIG. 2 is a partial perspective view of the door 2 near a door mirror 23 viewed from an arrow II direction in FIG. 1.

Note that front and rear, upward and downward, and left and right directions in the following explanation are directions viewed from a driver sitting in the vehicle V. The front and rear, upward and downward, and left and right directions are based on front and rear and upward and downward directions indicated by arrows in FIG. 1 and left and right directions indicated by arrows in FIG. 2.

As shown in FIG. 1, the door 2 is disposed in a vehicle body 1 to open and close a door opening 6 functioning as an entrance. The door opening 6 is assumed to be a door opening formed to be surrounded by a front pillar 3, a roof rail 4, a side sill 5, and a center pillar (not shown in FIG. 1).

The front end edge of the door 2 is attached to the vehicle body 1 via a hinge (not shown in FIG. 1). The rear edge side of the door 2 turns around the hinge to open and close the door opening 6.

The door 2 during closing closes the door opening 6 such that the side surface of the vehicle V is substantially flush.

The door 2 includes a door panel section 21 supported by the hinge (not shown in FIG. 1), a window section 22 disposed above the door panel section 21, and the door mirror 23.

The door panel section 21 is formed by an outer panel 21a facing the vehicle outer side and an inner panel (not shown in FIG. 1) disposed on the vehicle inner side to have a hollow section. On the vehicle inner side of the inner panel, a decoration lining (not shown in FIG. 1) is disposed to face a vehicle interior.

On the front side end face and the rear side end face of such a door 2, the inner panel (not shown in FIG. 1) is formed to be bent toward the outer panel 21a side such that the front side end face and the rear side end face conform to the shape of the door opening 6 opposed to these end faces. The inner panel is joined to the outer panel 21a by, for example, hemming for folding back the end edge of the outer panel 21a to the inner panel side.

The window section 22 is a frame member disposed above the door panel section 21 to be capable of moving a window glass 26 up and down. The window section 22 includes a sash 30 forming the upper edge of the door 2.

The sash 30 in this embodiment extends along the front pillar 3 and the roof rail 4 forming the door opening 6. The sash 30 is described in detail below together with the weather strip 10 (see FIG. 3).

Note that, in FIG. 1, reference numeral 31 represents a molding configuring the sash 30, 7a represents an upward extending section of a fender 7, and 8 represents a windshield.

As shown in FIG. 2, the door mirror 23 includes a mirror body 24 and a mirror supporting section 25. The mirror supporting section 25 is formed by a resin tabular body having a substantially triangular shape in side view such that the mirror supporting section 25 is fit in an acute angled corner section formed by the continuously formed lower edges of the upward extending section 7a of the fender 7 and the front pillar 3 and the upper edge of the door panel section 21. The mirror body 24 is formed integrally with the mirror supporting section 25. Incidentally, the mirror supporting section 25 is fastened and fixed, by bolts or the like, to a triangular corner section (not shown in FIG. 2) disposed on the back (the vehicle inner side) of the mirror supporting section 25 and integrally molded with a sash body 32. In FIG. 2, the sash body 32 indicated by a hidden line (a dotted line) and the molding 31 configure the sash 30. The sash body 32 is described in detail below.

A cutout section 25a, in which a front part of the molding 31 configuring the sash 30 is fit, is formed at the upper edge of the mirror supporting section 25. The cutout section 25a is formed to extend backward along the lower edge of the front pillar 3 from the vicinity of a joint 9 of design surfaces formed by the front pillar 3 and the upward extending section 7a of the fender 7.

Incidentally, the design surfaces (the vehicle outer side surfaces) formed by the front pillar 3 and the upward extending section 7a of the fender 7 are substantially flush with each other across the joint 9. However, although not shown in FIG. 2, the front pillar 3 further extends front obliquely downward on the back (the vehicle inner side) of the upward extending section 7a to be connected to an upper member (not shown in FIG. 2).

In FIG. 2, reference numeral 8 represents the windshield and reference sign G represents a gap between the door 2 and the door opening 6 of the vehicle body 1.

<The Weather Strip and the Sash>

The weather strip 10 and the sash 30 of the door 2 in this embodiment are described with reference to FIGS. 3 and 4.

Note that a door outer side direction in the following explanation means, the side view of the door 2, a direction away from a center C of the door panel section 21 in the side view of the door 2 during closing shown in FIG. 1. Specifically, in FIG. 3 (a III-III sectional view of FIG. 2) and FIG. 4 (a IV-IV sectional view of FIG. 2), the door outer side direction is an arrow D1 direction. The opposite direction (not shown in FIGS. 3 and 4) of the arrow D1 direction is the door inner side direction. In FIGS. 3 and 4, the vehicle inner side direction is indicated by an arrow D2 direction and the vehicle outer side direction is indicated by an arrow D3 direction.

Figure 3:
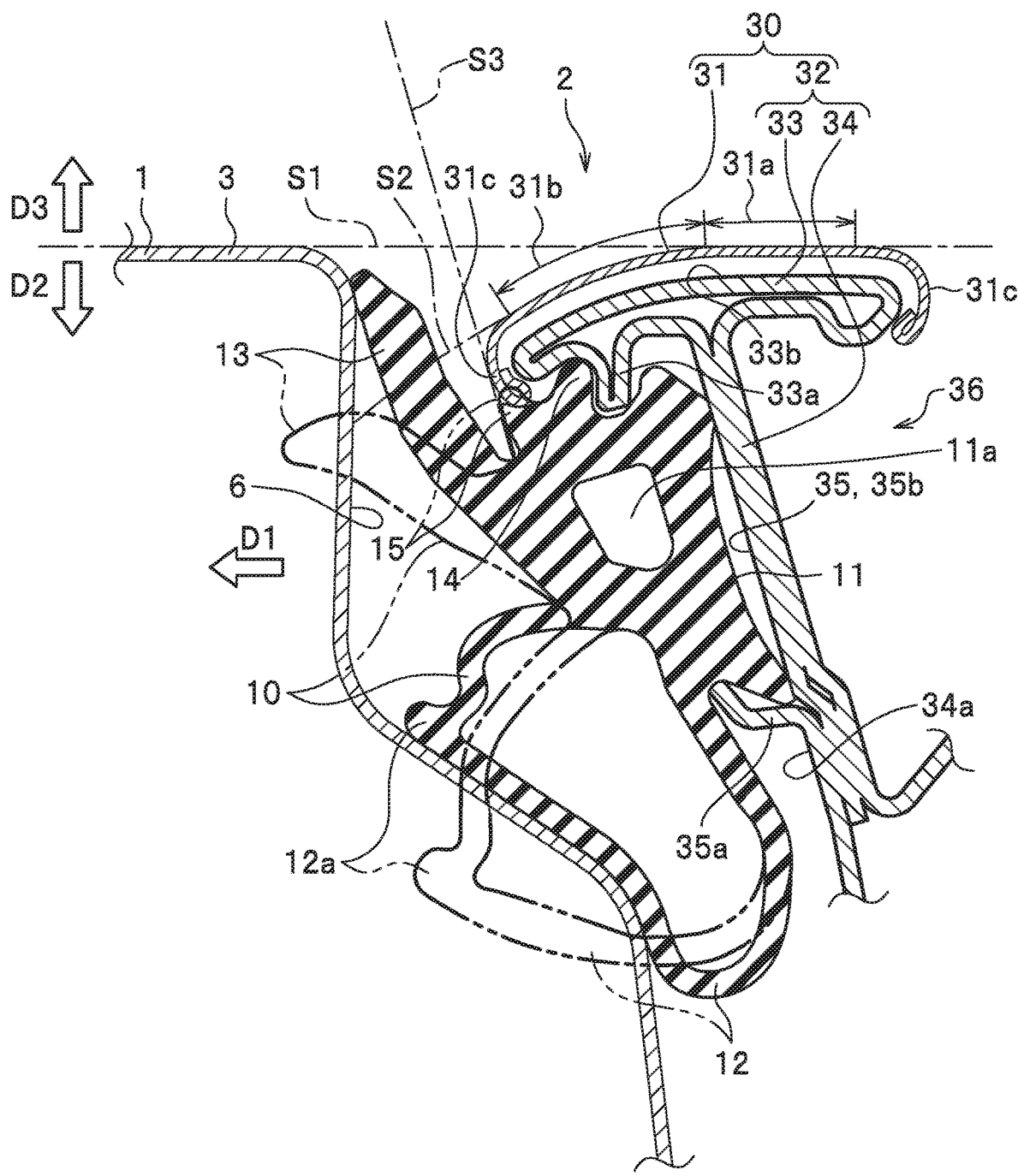
FIG. 3 is a sectional view of FIG. 2.

As shown in FIG. 3, the sash 30 includes the molding 31 forming a design surface on the vehicle outer side and the sash body 32.

The sash body 32 includes an outer section 33 to which the molding 31 is attached and an inner section 34 in which a retainer 35 described below is formed. Incidentally, the sash 30 during closing of the door 2 is opposed to the front pillar 3 configuring the door opening 6.

The front end portion of the molding 31 is formed to be fit in the cutout section 25a (see FIG. 2) of the mirror supporting section 25 (see FIG. 2) described above.

As shown in FIG. 1, the molding 31 extends to the rear end of the upper edge of the door 2 along the front pillar 3 and the roof rail 4.

As shown in FIG. 3, when viewed on a cross section in a latitudinal direction crossing the extending direction, such a molding 31 is formed by a plate body bent in the latitudinal direction. Specifically, the molding 31 includes a flush section 31 substantially flush with the design surface (the vehicle outer side surface) of the front pillar 3 and a curving section 31b curving at a predetermined curvature from the flush section 31a such that a surface section is gradually displaced to the vehicle inner side (the arrow D2 side) as the curving section 31b further extends to the front pillar 3 side.

The molding 31 includes, at both the end portions of a plate surface in the latitudinal direction of the sash 30, locking sections 31c that surround both the end portions of the outer section 33 described below from the outer side and lock the outer section 33.

Note that, in FIG. 3, reference sign S1 represents an imaginary extending surface to the molding 31 side of the design surface (the vehicle outer side surface) of the front pillar 3 and reference sign S2 represents an imaginary extending surface to the front pillar 3 side of the design surface (the vehicle outer side surface) of the molding 31. Incidentally, the extending surface S2 is assumed to be a surface extending while curving at the same curvature as the curvature of the curving surface 31b of the molding 31.

The outer section 33 and the inner section 34 in this embodiment are assumed to be an outer section and an inner section formed by applying bending by a roll or the like to a plate body. The outer section 33 and the inner section 34 are integral with each other. The outer section 33 and the inner section 34 assume a substantially T-shape in sectional view in a direction crossing the longitudinal direction of the sash 30.

The outer section 33 is formed along the vehicle inner side surface of the molding 31. The outer section 33 includes a molding attachment surface section 33b on the vehicle outer side of the outer section 33.

In the sash 30 in this embodiment, an adhesive (not shown in the FIG. 3) is interposed between the molding 31 and the outer section 33. That is, the molding 31 is supported on the outer section 33 by the adhesive and a locking sections 31c.

The inner section 34 includes a retainer forming surface section 34a on a side opposed to the front pillar 3 in a closed state of the door 2. Incidentally, a surface section on the front pillar 3 side opposed to the retainer forming surface section 34a configures the door opening 6 on the vehicle body 1 side shown in FIG. 1.

In the retainer forming surface section 34a, a retainer 35, into which a base 11 of the weather strip 10 described below is fit, is formed.

Note that the retainer forming surface section 34a in the inner section 34 is equal to an attachment surface of the base 11 of the weather strip 10 described below and is equivalent to an "attachment surface of the base" in claims.

In FIG. 3, reference sign S3 represents an imaginary reference plane parallel to the retainer forming surface section 34a (the attachment surface of the base) and in contact with the molding 31 furthest in the door outer side direction (the arrow D1 direction).

The reference plane S3 is referred to again in explanation of a protrusion 15 (a second elastic contact section) of the weather strip 10 described below.

The retainer 35 assumes a C-shape opening to the front pillar 3 side in sectional view in a direction crossing the longitudinal direction of the sash 30. Specifically, the retainer 35 is formed by a surface section 35b opposed to the front pillar 3, a wall section 35a rising toward the front pillar 3 side from the surface section 35b, and a projecting section 33a projecting to the vehicle inner side on the back (the vehicle inner side) of the outer section 33.

Note that, in FIG. 3, reference numeral 36 represents a holding section that holds a glass channel member (not shown in FIG. 3) of the window glass 26 (see FIG. 1).

The weather strip 10 is described.

As shown in FIG. 3, the weather strip 10 according to this embodiment includes the base 11 fit into the retainer 35, a seal section 12 integrally molded with the base 11, a lip 13 adjacent to the seal section 12 and extending from the base 11, and a pair of protrusions 14 and 15 formed between the root of the lip 13 on the opposite side of the seal section 12 and the base 11.

Note that, in FIG. 3, a rough external shape of the weather strip 10 before attachment to the door 2 is indicated by an imaginary line (an alternate long and two short dashes line). The weather strip 10 during the closing of the door 2 is indicated by a solid line.

The base 11 is formed by a long tabular body along the longitudinal direction of the sash 30 fit in the retainer 35 having a C-shape in sectional view. The base 11 is formed to be thick on the projecting section 33a side of the outer section 33 and thin on the wall section 35a side of the inner section 34 forming the retainer 35.

Clearance is provided at a predetermined interval between such a base 11 and the retainer 35.

The seal section 12 is formed to swell to the front pillar 3 side, in other words, the door opening 6 side of the vehicle body 1 from the base 11 on the wall section 35a side via an opening of the retainer 35. The seal section 12 is formed in an annular shape in sectional view.

The seal section 12 is elastically crushed flat during the closing of the door 2 to come into elastic contact with the front pillar 3 side (the door opening 6 side of the vehicle body 1). Consequently, it is possible to secure a large seal surface with respect to the front pillar 3. A protrusion 12a is formed at the distal end on the front pillar 3 side of the seal section 12. The protrusion 12a acts such that the seal section 12 is crushed flat without falling sideways during the closing of the door 2.

The lip 13 extends in a tongue shape toward the front pillar 3 side (the door opening 6 side of the vehicle body 1) from the base 11 on the vehicle outer side of the seal section 12. The lip 13 is equivalent to a "first lip" in claims.

The distal end portion of the lip 13 warps to the seal section 12 side as indicated by an imaginary line (an alternate long and two short dashes line) before attachment to the door 2 or during opening of the door 2.

The distal end portion of the lip 13 comes into elastic contact toward the front pillar 3 side (the door opening 6 side of the vehicle body 1) with the elastic force of the lip 13 itself during the closing of the door 2.

The distal end portion of the lip 13 during the closing of the door 2 is located further on the vehicle inner side than an imaginary extending surface S1 to the molding 31 side of the design surface (the vehicle outer side surface) of the front pillar 3. The distal end portion of the lip 13 during the closing of the door 2 is located further on the vehicle outer side than an imaginary extending surface S2 to the front pillar 3 side of the design surface (the vehicle outer side surface) of the molding 31.

Note that the design surface (the vehicle outer side surface) of the front pillar 3 is equivalent to a "vehicle outer side surface of the vehicle body" in claims.

The protrusion 14 is disposed to hold the projecting section 33a of the outer section 33 between the protrusion 14 and the end portion on the vehicle outer side of the base 11. The protrusion 14 is in elastic contact with the back (the vehicle inner side) of the outer section 33. That is, the protrusion 14 is in elastic contact with the outer section 33 further in the door outer side direction D1 than the base 11. Note that the protrusion 14 is equivalent to a "first elastic contact section" in claims. The outer section 33 is equivalent to a "sash of the door" in claims.

With such elastic contact of the protrusion 14 with the outer section 33, the base 11 can be disposed without backlash in the retainer 35.

The protrusion 15 is disposed between the protrusion 14 and the root of the lip 13. When the weather strip 10 is attached to the door 2, the protrusion 15 comes into press-contact with the edge portion on the front pillar 3 side of the molding 31 and is elastically deformed to be crushed toward the root side of the lip 13. Consequently, the protrusion 15 is in elastic contact with only the molding 31. The protrusion 15 is equivalent to a "second elastic contact section" in claims.

The protrusion 15 elastically deformed in this way is shifted and located further in the door inner side direction (the opposite direction of the arrow D1) than the reference plane S3 described above. Incidentally, the protrusion 15 may be located in contact with the reference plane S3 on the door inner side.

Note that a hollow section indicated by reference sign 11a in FIG. 3 facilitates the elastic deformation of the base 11 when the base 11 is fit into the retainer 35.

The weather strip 10 having the structure described above is attached to the sash 30 in which the molding 31 is disposed as described above.

Incidentally, as shown in FIG. 2, the molding 31 of the sash 30 in this embodiment is terminated near the joint 9 of the design surfaces formed by the front pillar 3 and the upward extending section 7a of the fender 7. More specifically, the molding 31 is terminated in a position beyond an end face 25b of the mirror supporting section 25 (an end face at the upper edge of the mirror supporting section 25 shown in FIG. 2).

On the other hand, as shown in FIG. 2, the sash body 32 extends to the front end portion of the door panel section 21. As described above, the front pillar 3 (see FIG. 2) forming the door opening 6 (see FIG. 2) further extends front obliquely downward on the back (the vehicle inner side) of the upward extending section 7a (see FIG. 2) of the fender 7 (see FIG. 2). The weather strip 10 also continuously extends along the sash body 32 extending on the back (the vehicle inner side) of the mirror supporting section 25 shown in FIG. 2.

Next, the structure of the weather strip 10 extending on the back (the vehicle inner side) of the mirror supporting section 25 continuously from the weather strip 10 (see FIG. 3) disposed in the door 2 including the molding 31 is described.

Figure 4:
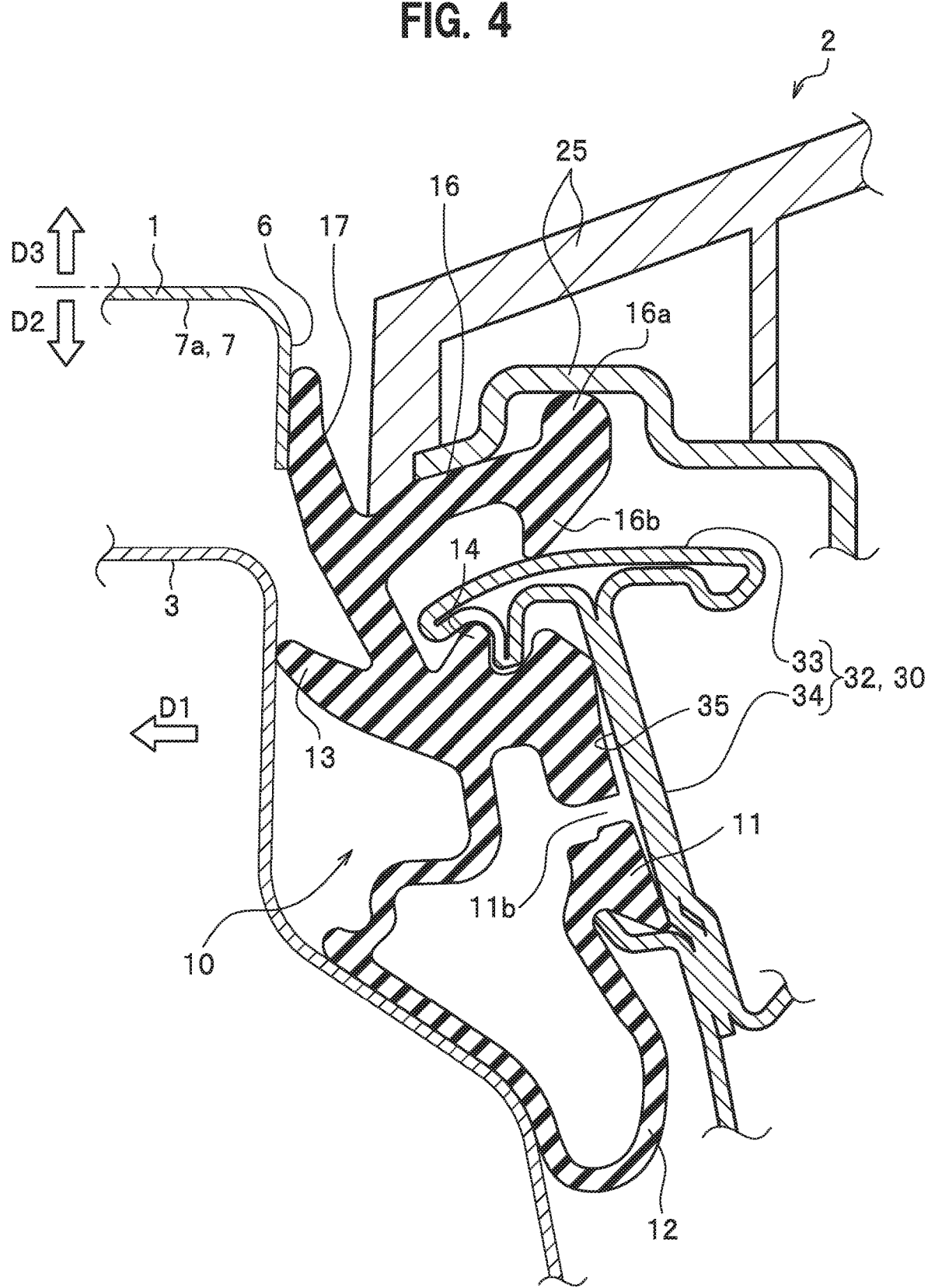
FIG. 4 is a IV-IV sectional view of FIG. 2.

In FIG. 4, which is a IV-IV cross section of FIG. 2, reference numeral 7*a* represents an upward extending section of the fender 7, 33 represents an outer section of the sash 30, 34 represents an inner section of the sash 30, and 35 represents a retainer.

The weather strip 10 includes, as shown in FIG. 4, the base 11, the seal section 12, the lip 13, and the protrusion 14.

The weather strip 10 extends continuously from the weather strip 10 shown in FIG. 3.

In the weather strip 10, a hollow section of the annular seal section 12 communicates with clearance formed in the retainer 35 via a communication path 11*b* formed in the base 11. The communication path 11*b* is a slit formed along the extending direction of the weather strip 10.

The weather strip 10 includes a first branching lip 16 and a second branching lip 17 instead of the protrusion 15 (the second elastic contact section) shown in FIG. 3.

The first branching lip 16 is a member held between the mirror supporting section 25 disposed instead of the molding 31 (see FIG. 2) and the sash body 32 (the outer section 33) of the sash 30. The first branching lip 16 is equivalent to a "second lip" in claims. The mirror supporting section 25 is equivalent to a "garnish" in claims.

The first branching lip 16 branches from the root of the lip 13 and bends halfway in extending to the vehicle outer side (the arrow D3 side) and is disposed between the mirror supporting section 25 and the outer section 33. The first branching lip 16 is in elastic contact with the mirror supporting section 25 in the root, where the first branching lip 16 branches. A first protrusion 16*a* at the distal end is in elastic contact with the mirror supporting section 25.

At the distal end of the first branching lip 16, a second protrusion 16*b* is formed on the opposite side of the first protrusion 16*a*. The second protrusion 16*b* is in elastic contact with a surface section on the vehicle outer side (the arrow D3 side) of the outer section 33.

The second branching lip 17 extends from the root side of the first branching lip 16 to the upward extending section 7*a* side of the fender 7. Incidentally, the upward extending section 7*a* of the fender 7 and the front pillar 3 configure the door opening 6 on the vehicle body 1 side. On the door 2 side, an end face 25*b* of the mirror supporting section 25 (the end face at the upper edge of the mirror supporting section 25 shown in FIG. 2) is disposed to be opposed to the upward extending section 7*a* of the fender 7.

The distal end portion of the second branching lip 17 is in elastic contact with the upward extending section 7*a* of the fender 7 (the door opening 6 on the vehicle body 1 side) with the elastic force of the second branching lip 17 itself.

The second branching lip 17 is equivalent to a "third lip" in claims. The upward extending section 7*a* of the fender 7 is equivalent to a "vehicle body panel on the vehicle outer side" in claims.

Incidentally, the front pillar 3, with which the lip 13 functioning as the first lip comes into elastic contact, is equivalent to a "vehicle body panel on the vehicle inner side" in claims.

Note that the distal end portion of the second branching lip 17 is disposed further on the vehicle inner side (the arrow D2 side) than an imaginary extending surface of a design surface in the upward extending section 7*a* of the fender 7.

Next, the structure of the weather strip 10 near the end face 25*b* (see FIG. 2) of the mirror supporting section 25 (see FIG. 2), which changes from the weather strip 10 shown in FIG. 3 to the weather strip 10 shown in FIG. 4, is described.

Figure 5A:
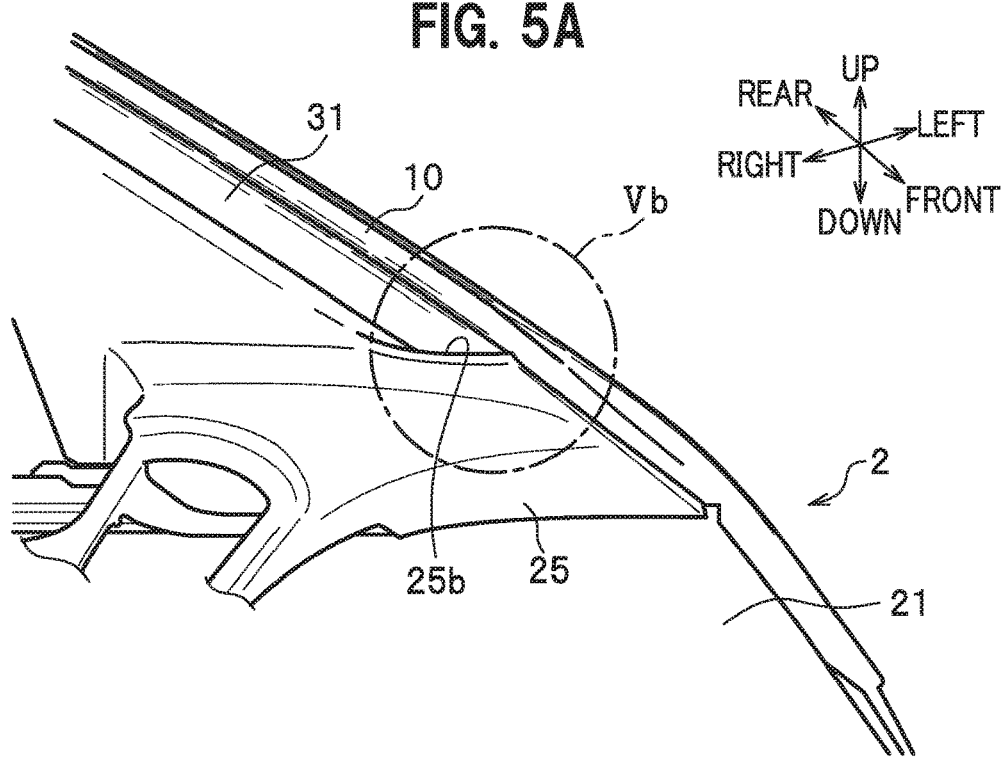
FIG. 5A is a partial perspective view showing a state in which the vicinity of a mirror supporting section of the door during opening is looked down from the right oblique upper front.
Figure 5B:
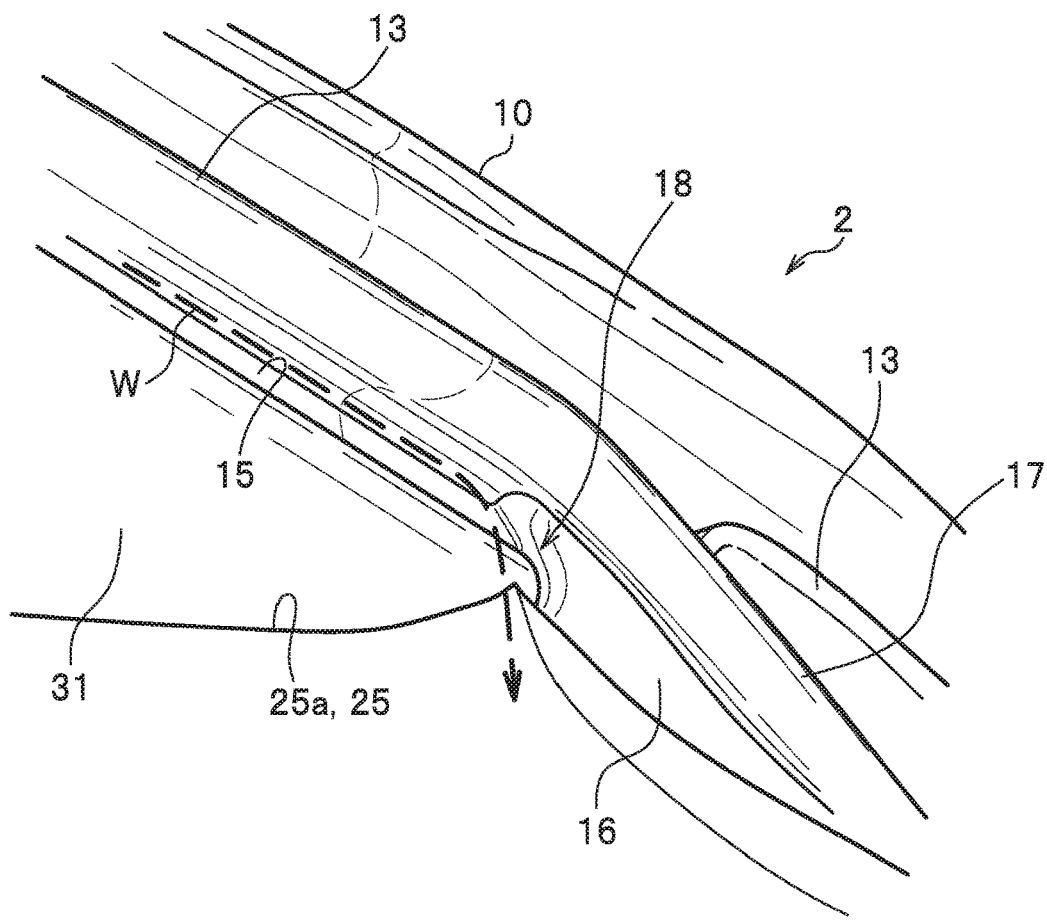
FIG. 5B is a partially enlarged perspective view of an arrow Vb section in FIG. 5A.

FIG. 5A is a partial perspective view showing a state in which the vicinity of the mirror supporting section 25 of the door 2 shown in FIG. 2 during opening is looked down from the right oblique upper front. Note that, in FIG. 5A, for convenience of drafting, illustration of the vehicle body 1 (see FIG. 2) and the mirror body 24 (see FIG. 2) forming the door opening 6 (see FIG. 2) is omitted. FIG. 5B is a partially enlarged perspective view of an arrow Vb section in FIG. 5A.

As shown in FIG. 5A, the weather strip 10 extends downward further forward in the vehicle than the end face 25*b* of the mirror supporting section 25.

As shown in FIG. 5B, the distal end of the second branching lip 17 merges with and continues to the distal end of the first lip 13 on the upper side of the vehicle.

As shown in FIG. 5B, the protrusion 15 (the second elastic contact section) of the weather strip 10 extending along the molding 31 shown in FIG. 3 changes the form thereof to the first branching lip 16 across the front end portion of the molding 31 and further extends forward. That is, the protrusion 15 of the weather strip 10 and the first branching lip 16 are continuous. The rear end portion of the first branching lip 16 connected to the front end portion of the protrusion 15 increases in thickness and projects further to the door outer side direction (the arrow D1 (see FIG. 3) side) than the protrusion 15. Consequently, the rear end portion of the first branching lip 16 passes across a line of reference sign S3 (see FIG. 3) in the door outer side direction to form a thick overlaying wall section 18 shown in FIG. 5B.

Although not shown in FIG. 5B, the overlaying end portion 18 comes into elastic contact with and covers the surface of the molding 31 and is disposed on the vehicle inner side (the arrow D2 (see FIG. 3) side) of the mirror supporting section 25. The rear end portion of such a first branching lip 16 is in a state in which the rear end portion is held by and in elastic contact with the molding 31 and the mirror supporting section 25.

In the weather strip 10, in a state of the door 2 during the closing, the protrusion 15 (the second elastic contact section) of the weather strip 10 and the molding 31 form a seal structure. With such a seal structure, water W gathered between the first lip 13 and the protrusion 15 of the weather strip 10 flows down along the sash 30 (see FIG. 1) according to an inclination gradient of the front pillar 3 (see FIG. 1). Thereafter, as shown in FIG. 5B, the water W is dammed by the overlaying wall section 18 present near connection to the mirror supporting section 25 and further runs along the rear end portion of the first branching lip 16 to be caused to flow out to the vehicle outer side.

The weather strip 10 according to this embodiment is described with reference to, as an example, the weather strip 10 including the seal structure disposed between the sash 30 portion including the molding 31 and the door opening 6 and between the mirror supporting section 25 and the door opening 6. In such a weather strip 10, a seal structure disposed between the door 2 and the door opening 6 in a region other than the above is not particularly limited. For example, there is a seal structure including at least the base 11 and the seal section 12.

<Operational Effects>

Operational effects achieved by the weather strip 10 according to this embodiment are described.

The weather strip 10 according to this embodiment includes the protrusion 14 (the first elastic contact section) that comes into elastic contact with the sash 30 of the door 2 further in the door outer side direction than the base 11 and the protrusion 15 (the second elastic contact section) that comes into elastic contact with the sash 30 further in the door outer side direction than the protrusion 14 (the first elastic contact section). The protrusion 15 (the second elastic contact section) is in elastic contact with at least the molding 31.

With such a weather strip 10, with the protrusion 15 (the second elastic contact section), it is possible to more surely prevent water from intruding into the vehicle inner side via a space between the sash 30 and the weather strip 10.

With the weather strip 10, since the protrusion 15 (the second elastic contact section) is in elastic contact with the molding 31, it is possible to prevent water from intruding into the back (the vehicle inner side) of the molding 31.

In the weather strip 10, the protrusion 15 (the second elastic contact section) is in elastic contact with only the molding 31.

With the weather strip 10, for example, unlike a weather strip in which the protrusion 15 (the second elastic contact section) comes into elastic contact with both of the molding 31 and another member adjacent to the molding 31, it is possible to concentrate the elastic force of the protrusion 15 (the second elastic contact section) on the molding 31. Consequently, seal performance by the protrusion 15 (the second elastic contact section) of the weather strip 10 is further improved.

In the weather strip 10, the protrusion 15 (the second elastic contact section) is disposed further on the door inner side than the imaginary reference plane S3.

With the weather strip 10, since the protrusion 15 (the second elastic contact section) is less easily seen from the gap between the door 2 and the door opening 6, a design property of the vehicle body 1 is improved.

In the weather strip 10, the distal end portion of the lip 13 is located further on the vehicle inner side than the imaginary extending surface S1 to the molding 31 side of the design surface (the vehicle outer side surface) of the front pillar 3.

With the weather strip 10, since the distal end portion of the lip 13 is less easily seen from the gap between the door 2 and the door opening 6, a design property of the vehicle body 1 is improved.

The lip 13 is prevented from being rolled up by water flowing on the vehicle outer side surface of the vehicle body. Consequently, the seal performance of the weather strip 10 is further improved.

The distal end portion of the lip 13 is located further on the vehicle outer side than the imaginary extending surface S2 to the front pillar 3 side of the design surface (the vehicle outer side surface) of the molding 31.

With the weather strip 10, when water powerfully flows into the gap between the door 2 and the door opening 6 from the vehicle outer side, it is possible to more surely prevent the lip 13 from being reversely rotated to the vehicle inner side by water pressure. Consequently, the seal performance of the weather strip 10 is further improved.

In the weather strip 10, the first branching lip 16 (the second lip) is held between the mirror supporting section 25 (the garnish) disposed instead of the molding 31 and the sash body 32 (the outer section 33).

With the weather strip 10, seal performance between the mirror supporting section 25 (the garnish) and the sash body 32 (the outer section 33) is improved.

In the weather strip 10, during the closing of the door 2, the second branching lip 17 (the third lip) comes into elastic contact with the upward extending section 7a of the fender 7 (the vehicle body panel on the vehicle outer side).

With the weather strip 10, the lip 13 (the first lip) comes into elastic contact with the front pillar 3 (the vehicle body panel on the vehicle inner side) and, in addition, the second branding lip 17 (the third lip) comes into elastic contact with the upward extending section 7a (the vehicle body panel on the vehicle outer side).

Consequently, reaction received by the weather strip 10 from the vehicle body 1 side (the door opening 6 side) increases. Adhesion of the base 11 to the retainer 35 is improved.

The seal performance of the weather strip 10 is further improved.

The embodiment of the present invention is described above. However, the present invention is not limited to the embodiment and can be carried out in various forms.

In this embodiment, the example is described in which the weather strip 10 is applied to the front side door of the vehicle V. However, the present invention can also be applied to all other doors in which the sash 30 including the molding 31 is disposed.

What is claimed is:

1. A vehicle weather strip comprising:
    a base that is attached to a door;
    a first elastic contact section that comes into elastic contact with a sash of the door further in a door outer side direction than the base; and
    a second elastic contact section that comes into elastic contact with the sash further in the door outer side direction than the first elastic contact section, wherein
    the second elastic contact section is in elastic contact with at least a molding in the sash, and wherein the second elastic contact section is disposed further on a door inner side than a reference plane that is parallel to an attachment surface of the base of the door and in contact with the molding furthest on a door outer side.

2. The vehicle weather strip according to claim 1, wherein the second elastic contact section is in elastic contact with only the molding.

3. The vehicle weather strip according to claim 1, further comprising a first lip extending in the door outer side direction from the base, wherein
    a distal end portion of the first lip in elastic contact with a door opening of a vehicle body in a state in which the door closes the door opening is located further on a vehicle inner side than a vehicle outer side surface of the vehicle body and located further on a vehicle outer side than an imaginary extending surface to the door opening side of a vehicle outer side surface in the molding.

4. A vehicle weather strip comprising:
    a base that is attached to a door;
    a first elastic contact section that comes into elastic contact with a sash of the door further in a door outer side direction than the base; and
    a second elastic contact section that comes into elastic contact with the sash further in the door outer side direction than the first elastic contact section,
    wherein
    the second elastic contact section is in elastic contact with at least a molding in the sash, the vehicle weather strip further including a first lip extending in the door outer side direction from the base, the base is attached to a sash body section disposed on the vehicle inner side of the molding, at least the base and the first lip extend also from a position where the molding is terminated, a second lip branches from the first lip extending from the position where the molding is terminated, and the second lip is held between the sash body section and a garnish disposed instead of the molding.

5. The vehicle weather strip according to claim 4, wherein a third lip further branches from the second lip, and a distal end portion of the first lip is in elastic contact with a vehicle body panel on the vehicle inner side of double vehicle body panels on an inside and an outside on the vehicle body side forming the door opening, and a distal end portion of the third lip is in elastic contact with the vehicle body panel on the vehicle outer side.

* * * * *